United States Patent Office 3,384,171
Patented May 21, 1968

3,384,171
AQUEOUS FLUID DRIVE OIL
RECOVERY PROCESS
Harry W. Parker, Bartlesville, Okla., assignor to Phillips
Petroleum Company, a corporation of Delaware
No Drawing. Filed Feb. 20, 1967, Ser. No. 617,055
6 Claims. (Cl. 166—9)

ABSTRACT OF THE DISCLOSURE

A method of producing oil utilizing an aqueous slug of surfactant and surfactant-carrier injected into an oil-bearing stratum in which an aqueous slug containing a clay-coating material is injected into the stratum ahead of the surfactant-carrier and surfactant.

This invention relates to producing oil from an oil-bearing stratum. In another aspect this invention relates to producing oil from an oil-bearing stratum by an aqueous fluid drive. In another aspect this invention relates to coating the clay particles present in an oil-bearing stratum.

Production of oil can be by any known reservoir-producing techniques, as for example, by water drive, gas cap drive, dissolved gas drive, gravity drainage, etc. The most efficient of these displacement mechanisms, whether it be primary (naturally occurring) or secondary (rejuvenating) operation, is displacement of oil by water. When water attains a certain local saturation during a water drive operation, the continuous oil filaments break into disjointed segments which are entrapped and held immobile. Surface active agents or surfactants have been employed to reduce the magnitude of capillary forces in an attempt to prevent entrapment of the oil or to free oil which has been trapped.

Certain minute solids, when added to an aqueous slug containing dissolved surfactants, function as carriers for the surfactants and transport the surfactants deeper into the stratum, effecting distribution of oil displacing surfactant to a greater depth and over a greater area of the stratum. "Surfactant-carrier" as used in this application is defined as a solid particle in the size range of about 0.001 to 1 micron, which when in suspension adsorbs surfactants from the suspending fluid.

In some instances, the aqueous slug containing surfactant and surfactant-carrier has not given the expected results of good stratum penetration. Clay particles in the stratum are responsible for premature deposition of the surfactant-carrier in the stratum. The detrimental action of the clay may result from adherence of the surfactant or surfactant-carrier or may result from the swelling of clay particles to block the porous stratum to such an extent that the surfactant-carrier can no longer pass through the porous stratum. The invention minimizes or eliminates the deposition difficulties encountered in such a stratum by injecting into the stratum an additive which coats the clays prior to injecting the surfactant and surfactant-carrier.

Accordingly, it is an object of this invention to produce oil from an oil-bearing stratum by an aqueous fluid drive utilizing an oil-displacing surfactant transported on a surfactant-carrier in an aqueous slug.

Another object of this invention is to prevent stratum plugging in an aqueous fluid drive recovery process.

A further object is to effect economies in oil production operations.

Other objects will be apparent to one skilled in the art upon consideration of the accompanying disclosure and appended claims.

According to the invention, a first aqueous slug containing an additive to coat the clay particles in a stratum is injected into an oil-bearing stratum through a well penetrating the stratum, a second aqueous slug containing an oil-displacing surfactant and surfactant-carrier is injected into the stratum, and both slugs are driven away from the injection well in order to displace oil from the stratum.

The slugs are driven on through the stratum toward an offset production well, carrying the displaced oil into the production well for production therefrom by conventional means, such as pumping. The injected slugs can be driven with a suitable driving fluid to a plurality of offset wells which can lie in a ring pattern around the injection well.

Clay-coating materials of this invention include metal lignosulfonates, alkaline lignosulfonates, sulfoalkylated tannins, metal complexes of sulfoalkylated tannins, and a mixture of these metal complexes of sulfoalkylated tannins with water soluble cationic and anionic compounds of chromium, aluminum, vanadium, titanium, zinc, manganese, and mixtures thereof. Ferrochrome lignosulfonates and calcium lignosulfonates have very good clay-coating properties. The tannin additives used in the practice of this invention can be derived from the vegetable tannins including both the gallotannins and the the flavotannins. Quebracho is one preferred tannin.

The metal complex or sulfoalkylated tannins mentioned above utilizes a metal selected from the group consisting of iron, copper, chromium, nickel, cobalt, manganese, zinc, aluminum, titanium, vanadium, and mixtures thereof. Metal compounds which can be used in combination with the recited metal complexes are the water soluble cationic and anionic compounds of amphoteric metals such as chromium, aluminum, vanadium, titanium, zinc, and manganese.

It is believed that the named materials form a polymolecular layer or film on the surface of clay particles. Such a film acts to minimize deposition of surfactants contained in the second slug on the clay and to render the clay inert to the water swelling action. This permits a given amount of surfactant and surfactant-carrier to be driven to a greater depth in the stratum, than is the case when clay is not precoated with lignosulfonates, etc. Conversely, less surfactant and surfactant-carrier can be used to penetrate to an equivalent depth in a formation when the clay-coating material is used.

The concentration of the clay-coating material will vary with the type and amount of clay in the stratum but generally will be in the range of 0.5 to 20 weight percent of the aqueous slug. The pore volume of the slug containing the clay-coating additive should be sufficient to coat clay particles; therefore, the pore volume will depend upon the individual characteristics of the oil-bearing stratum, but usually will be within the range of 0.1 to 0.5 pore volume.

Known surfactant-carriers include particles of carbon black, talc, and non-swelling kaolin. Other solids which function similarly are dead microorganisms, for example, bacteria and yeast cells. Concentration of the solids in the aqueous solution is in the range of 0.05 to 2 weight percent and is effective to distribute the surfactant to the desired depth in most oil-bearing stratums.

Non-ionic surfactants conventionally used in combination with surfactant-carriers are hydrophilic or lyophilic agents. Exemplary agents are those obtained by the reaction of a hydrophobic hydroxy compound such as phenol or alcohol with several mols of alkylene oxide, principally ethylene oxide or propylene oxide. One class of compounds which is especially effective as surfactants is polyethylene oxide ethers and thioethers having a maximum ethylene oxide chain length at the hydrophilic end in the range of 4 to 6.5 mols and having a single terminal hydroxyl group. The concentration of the surfactant in the aqueous solution is in the range of 0.001 to 5 weight percent of the aqueous slug. The amount of the aqueous slug containing surfactant and surfactant-carrier lies in the range of 0.1 to 1.0 pore volume, although lesser or greater pore volumes of the suspended solids and surfactant can be utilized depending upon the pore size and pore character of the oil-bearing stratum being produced.

EXAMPLE

The oil displacing properties of aqueous solutions are determined by tube displacement tests. A 6-foot long steel tube having a 1-inch inner diameter is packed with approximately 800 grams of reservoir sand from the Burbank Field located in Osage and Kay Counties in Oklahoma. The Burbank sand contains 15 to 20 percent clay and/or clay-sized particles. The sand is packed in a tube (the tube) to obtain a porosity of approximately 35 to 40 percent. The tube is then flooded with Burbank oil to obtain 100 percent oil saturation. Burbank oil has a specific gravity of 0.835 at 78° F. or 38 A.P.I. and a viscosity of 6.8 centipoises at 78° F. The pore volume is then determined. An aqueous flood solution of brine is prepared by adding 725.4 grams of sodium chloride, 190.3 grams of calcium chloride, 85.7 grams of magnesium chloride containing six molecules of hydration to 18 liters of water. The tube is then flooded at a rate of 1 milliliter per minute with the brine and the amount of oil produced and water-oil ratio is measured. Flooding is continued until a water-oil ratio of 100 is obtained and the percent oil saturation is then determined. After these steps conditions in the tube approximate the conditions of a depleted reservoir.

Four displacement tubes are prepared according to the above-described method. In the following tests, Philblack I (a trademark of Phillips Petroleum Company), a furnace black, is used as the particulate solid surfactant-carrier, illustrative of the other surfactant-carriers. Igepal CO-530 is added to the suspension as an oil-displacing surfactant. Igepal CO-530 is a trade name of Antara Chemical Division of General Aniline and Film Corporation, for nonylphenoxy polyethanol having an average of 6 to 6.5 units of ethylene oxide in the hydrophilic chain.

Tube 1 is flooded with a 2 pore volume aqueous slug comprising 0.06 weight percent Igepal CO-530 and 0.01 weight percent Philblack. This 2 pore volume aqueous slug is driven with aqueous driving fluid through the tube until a water-oil ratio of 100 is obtained. The percent oil saturation of the sand in the tube is measured and the amount of carbon black recovered in the produced fluid is determined.

Tube 2 is flooded with a first 0.3 pore volume aqueous slug comprising 2 weight percent calcium lignosulfonate, followed by a second 2 pore volume aqueous slug comprising 0.06 weight percent Igepal CO-530 and 0.01 weight percent Philblack.

Tube 3 is flooded with a first 0.3 pore volume aqueous slug comprising 2 weight percent ferrochrome lignosulfonate, followed by a second 2 pore volume aqueous slug comprising 0.06 weight percent Igepal CO-530 and 0.01 weight percent Philblack.

Tube 4 is flooded with a 0.3 pore volume aqueous slug comprising 2 weight percent sulfoalkylated quebracho and sodium dichromate followed by a 2 pore volume aqueous slug comprising 0.06 weight percent Igepal CO-530 and 0.01 weight percent Philblack.

The aqueous slugs injected in the tubes 2, 3, and 4 are all driven with an aqueous driving fluid until a water-oil ratio of 100 is obtained in the produced fluid from each tube. The percent oil saturation of the sand in the tubes is measured and the amount of carbon black recovered in the produced fluids is determined.

The table compares oil recovery and carbon black recovery from the displacement tubes.

TABLE

| Tube No. | 1 | 2 | 3 | 4 |
|---|---|---|---|---|
| Porosity (percent) | 38.2 | 40.5 | 35.0 | 36.1 |
| Oil Saturation After Flooding with Brine (percent) | 30.0 | 31.5 | 29.2 | 28.0 |
| Oil Saturation After Additive Flood (percent) | 14.7 | 15.0 | 14.3 | 12.6 |
| Oil Produced by Additive Flood (percent) | 15.3 | 16.5 | 14.9 | 15.4 |
| Carbon Black Recovered in Produced Fluid (percent) | 0 | 10.0 | 17.5 | 7.8 |

No carbon black is recovered from tube 1 indicating excess loss of surfactant on the clays and pore plugging. Tests on tubes 2, 3, and 4 result in the recovery of carbon black in the produced fluid, indicating that less carbon black and oil displacing surfactant were deposited on the clay. The recovered carbon black is that which would be available to be driven deeper into an oil-bearing stratum under field conditions, and recover additional oil.

Reasonable modification and variation are within the scope of the invention which sets forth a novel method of recovering oil.

That which is claimed is:

1. The method of producing oil from an oil-bearing stratum comprising the steps of:
   (1) injecting into said stratum through a well therein a first aqueous slug containing a clay-coating material in solution therein in a concentration in the range of about 0.5 to 20 weight percent;
   (2) thereafter injecting into said stratum through said well a second aqueous slug containing a non-ionic surfactant therein in a concentration in the range of about 0.001 to 5 weight percent and suspended 0.001 to 1 micron size particles of a surfactant-carrier in a concentration in the range of 0.05 to 2 weight percent; and
   (3) driving the second slug after the first slug into said stratum away from said well so as to displace oil from said stratum.

2. The method of claim 1 including the step of producing oil from a well penetrating said stratum.

3. The process of claim 1 wherein said clay-coating material is selected from the group consisting of metal lignosulfonates, alkaline lignosulfonates, sulfoalkylated tannins, metal complexes of sulfoalkylated tannins, and metal complexes of sulfoalkylated tannins and water-soluble cationic and anionic compounds of chromium, aluminum, vanadium, titanium, zinc, manganese, and mixtures thereof.

4. The process of claim 1 wherein said surfactant is selected from the group consisting of polyethylene oxide ethers and thioethers having a maximum ethylene oxide chain length at the hydrophilic end in the range of 4 to 6.5 mols with a single terminal hydroxyl group.

5. The process of claim 1 wherein said surfactant-carrier is selected from the group consisting of carbon black, talc particles, kaolin particles, and dead microorganisms.

6. The process of claim 1 wherein the amount of said first slug is in the range of 0.1 to 0.3 pore volume and the amount of said second slug is in the range of 0.1 to 1.0 pore volume.

References Cited

UNITED STATES PATENTS

| 2,947,360 | 8/1960 | Bernard | 166—9 |
| 3,036,630 | 5/1962 | Bernard et al. | 166—9 |
| 3,160,205 | 12/1964 | Harvey et al. | 166—9 |
| 3,289,759 | 12/1966 | Fisher | 166—9 |
| 3,326,287 | 6/1967 | Corrin | 166—9 |
| 3,335,794 | 8/1967 | Bond | 166—9 |

STEPHEN J. NOVOSAD, *Primary Examiner.*